H. FOWLER.
EYE-GLASSES.
No. 180,708. Patented Aug. 8, 1876.
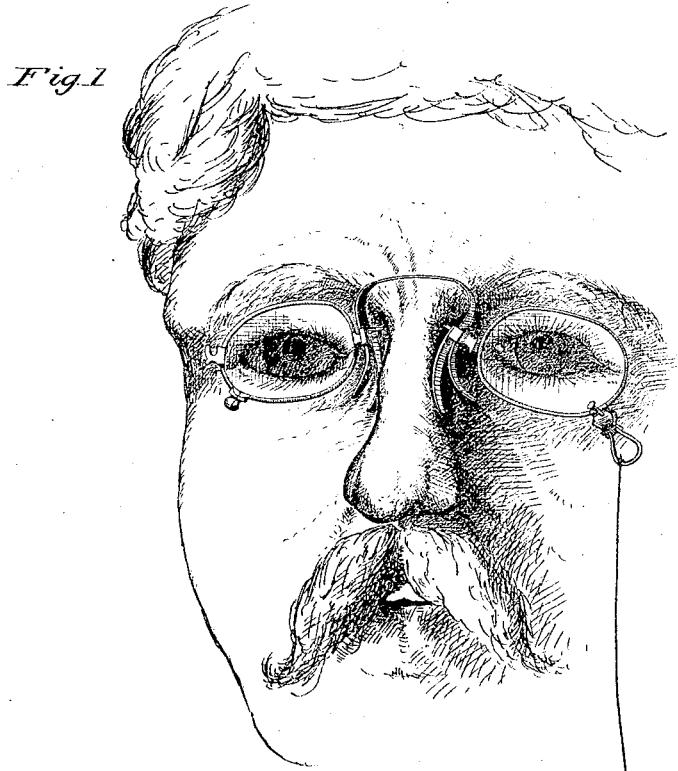
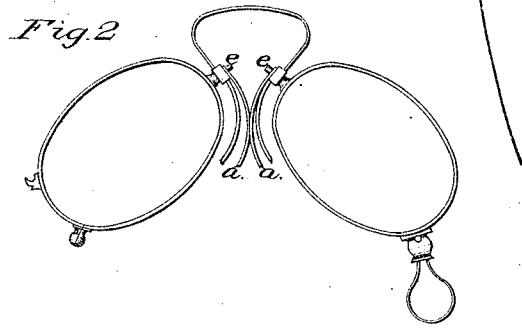
Witnesses: Inventor:
Thomas C. Connolly. Harvey Fowler
B. H. West

UNITED STATES PATENT OFFICE.

HARVEY FOWLER, OF WASHINGTON, DISTRICT OF COLUMBIA.

IMPROVEMENT IN EYEGLASSES.

Specification forming part of Letters Patent No. 180,708, dated August 8, 1876; application filed July 5, 1876.

*To all whom it may concern:*

Be it known that I, HARVEY FOWLER, of Washington city, District of Columbia, have invented an Improvement in the Construction of the Apparatus Connected with the Frames or Rims of Eyeglasses, the purpose of which is to furnish a method of holding the glasses upright, and preventing them from tipping forward, of which the following is a specification:

Referring to the drawing, the adjustment of the glasses upon the nose is shown in Fig. I; and Fig. II is a plan view, showing the braces *a a* pendent in the plane of the glasses, ready to be infolded when not in use.

My improvement consists of a pair of slightly-flexible braces or supporters, *a a*, hinged or pivoted upon a stem, *e*, or other projection from the upper and inner portion of the rim of each glass, so as to be deflected forward along the sides of the nose when the glasses are adjusted before the eyes, being checked by a shoulder, or by a pinch in the joint at *e*, so as to prevent them from turning too far, thus sustaining said glasses in their upright position.

I claim—

The hinged flexible braces or supporters *a a*, connected with the stems *e e*, as and for the purpose specified.

HARVEY FOWLER.

Witnesses:
    THOMAS C. CONNOLLY,
    B. H. WEST.